United States Patent
Sato et al.

(10) Patent No.: US 6,909,590 B2
(45) Date of Patent: Jun. 21, 2005

(54) HIGH VOLTAGE CAPACITOR AND MAGNETRON

(75) Inventors: Tsukasa Sato, Tokyo (JP); Isao Fujiwara, Tokyo (JP); Makoto Morita, Tokyo (JP); Kenichi Horikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/913,367

(22) Filed: Aug. 9, 2004

(65) Prior Publication Data

US 2005/0073799 A1 Apr. 7, 2005

(30) Foreign Application Priority Data

Sep. 29, 2003 (JP) ....................................... 2003-337947

(51) Int. Cl.[7] ................................................ H01G 4/35
(52) U.S. Cl. ....................... 361/302; 361/303; 361/305; 361/307; 361/306.2; 361/315
(58) Field of Search ................................. 361/302, 303, 361/305, 306.1, 306.3, 307, 301.1, 314, 315

(56) References Cited

U.S. PATENT DOCUMENTS

| | | | | |
|---|---|---|---|---|
| 5,544,002 A | * | 8/1996 | Iwaya et al. ................ | 361/302 |
| 5,729,425 A | * | 3/1998 | Fujiwara et al. ............ | 361/305 |
| 6,288,886 B1 | * | 9/2001 | Sato et al. .................. | 361/302 |
| 6,344,962 B2 | * | 2/2002 | Asada et al. ................ | 361/302 |

FOREIGN PATENT DOCUMENTS

| | | |
|---|---|---|
| JP | 4-40524 | 4/1992 |
| JP | 8-316099 | 11/1996 |

* cited by examiner

*Primary Examiner*—Dean A. Reichard
*Assistant Examiner*—Nguyen T. Ha
(74) *Attorney, Agent, or Firm*—Oblon, Spivak, McClelland, Maier & Neustadt, P.C.

(57) ABSTRACT

A capacitor has electrodes at surfaces thereof, with one of the electrodes secured onto one surface of a grounding metal. Through conductors pass through the capacitor and the grounding metal and are connected to the other electrodes so as to achieve electrical continuity. An insulating case is provided at one surface of the grounding metal, with one end of the insulating case fitted around the external circumference of the raised portion of the grounding metal. Insulating resin fills a space inside the insulating case, the internal space of the grounding metal and a space around the capacitor. The insulating resin comprises an epoxy resin containing a brominated fire retardant, and the brominated fire retardant is a brominated aromatic glycidyl ether.

4 Claims, 4 Drawing Sheets

HIGH VOLTAGE CAPACITOR AND MAGNETRON

BACKGROUND OF THE INVENTION

1. Field of the Invention

The present invention relates to a high-voltage capacitor and a magnetron having a filter constituted of the high-voltage capacitor.

2. Discussion of Background

Well-known examples of high-voltage capacitors of this type in the prior art include those disclosed in Japanese Unexamined Patent Publication No. 1996-316099 and Japanese Unexamined Utility Model Publication No. 1992-40524. They have the following structural features in common. Two through holes are formed over a distance from each other at a dielectric ceramic material to constitute the capacitor. Individual electrodes that are independent of each other and a common electrode to be shared by the individual electrodes are provided at the two surfaces of the dielectric ceramic material at which the through holes open. The common electrode is fixed on a raised portion of a grounding metal by a means such as soldering. Through conductors are provided so as to pass through the through holes at the capacitor and through holes formed at the grounding metal. The through. conductors are soldered to the individual electrodes at the capacitor by using electrode connectors or the like. An insulating case is fitted around the external circumference of the raised portion of the grounding metal so as to enclose the capacitor. An insulating cover is fitted on the other side of the grounding metal so as to enclose the through conductors. The insulating cover is mounted so that it comes in close contact with the internal circumferential surface of the raised portion of the grounding metal. Then, a thermosetting insulating resin such as an epoxy resin is charged to fill the space inside the insulating case and outside the capacitor enclosed by the insulating case to assure satisfactory moisture resistance and insulation.

However, the insulating resin is simply charged in close contact with the internal and external circumferential surfaces of the raised portion of the grounding metal, the internal circumferential surface of the insulating case, and the internal and external surfaces of the capacitor, and the insulating resin is not bonded onto said surfaces. As a result, the stress which occurs while the insulating resin is becoming hardened and contracting, and the stress which repeatedly occurs during operation of the high-voltage capacitor, cause a gap to form between the insulating resin and the dielectric ceramic material and also induce formation of a gap between the insulating resin and the internal circumferential surface of the insulating case and between the insulating resin and the grounding metal.

Main causes of the above-mentioned gaps include the stress occurring while the thermosetting insulating resin such as an epoxy resin is becoming hardened and contracting and the stress attributable to the electrostrictive phenomenon occurring at the dielectric ceramic material constituting the capacitor.

The main constituent of the dielectric ceramic material constituting the capacitor is barium titanate. Such a dielectric ceramic material is a ferroelectric material that belongs to the piezoelectric crystal class. A ferroelectric material belonging to the piezoelectric crystal class imparts a reverse piezoelectric effect. As a result, when a high AC voltage is applied, mechanical energy is generated inside the dielectric ceramic material constituting the capacitor.

For instance, if this type of high-voltage capacitor is employed in a filter of a magnetron in a microwave oven, a. high AC voltage for oscillating the magnetron is applied to the capacitor. When such a high AC. voltage is applied to the dielectric ceramic material, the reverse piezoelectric effect mentioned earlier converts the electrical energy to mechanical energy. This results in the dielectric ceramic material expanding while the voltage is being applied and contracting to regain its original state when the voltage is not applied.

A voltage of approximately 4 $kV_{O-P}$ having a commercial frequency or a frequency in the range of 20 kHz to 40 kHz is applied to oscillate the magnetron. in a microwave oven. In addition, a transient voltage of 0 to 40 $kV_{P-P}$ is applied immediately before the magnetron starts to oscillate. In response to these AC voltages, the dielectric ceramic material constituting the capacitor repeats a process of expanding and contracting. This is referred to as an electrostrictive phenomenon of a dielectric ceramic material.

The electrostrictive phenomenon is the main cause of inducing formation of a gap between the dielectric ceramic material and the insulating resin and also inducing formation of a gap between the insulating resin and the internal circumferential surface of the insulating case and between the insulating resin and the grounding metal. Thus, high-voltage capacitors of this type in the prior art pose a risk of early defects occurring due to deterioration of characteristics and short circulation occurring between electrodes.

Another cause of deterioration of characteristics includes settling of a fire retardant into a groove formed in the dielectric ceramic material.

An epoxy resin containing hexabromobenzene that is an additional fire retardant has been used as a conventional insulating resin. In this case, the fire retardant comprises rod-like particles of large sizes, so the specific gravity of the fire retardant is greater than that of the base resin. As a result, the fire retardant is liable to settle onto the insulation interface to be unevenly distributed. The fire retardant itself is inferior to the base resin in insulating property and also adversely affects the bonding strength of the dielectric ceramic material and the base resin. In addition, the settling of the fire retardant causes problems such as variations in initial breakdown voltage and relatively early deterioration in high temperature load property.

SUMMARY OF THE INVENTION

It is an object of the present invention to provide a high-voltage capacitor achieving a high degree of reliability in which deterioration of the characteristics and electrical short circulation are avoided by increasing the bonding forces at the interfaces between the insulating case and the insulating resin portion filling the inside of the case and between the grounding metal and the insulating resin portion filling the inside of the case and the bonding force at the interface between the capacitor and the insulating resin portion filling the space around the capacitor, and thus preventing separation at the interfaces, and to provide a magnetron utilizing the high-voltage capacitor as a filter.

In order to achieve the objects described above, the high-voltage capacitor according to the present invention comprises at least one grounding metal, at least one capacitor, at least one through conductor, at least one insulating tube, at least one insulating case and insulating resin.

The grounding metal has a raised portion at one surface thereof, with the raised portion having a through hole passing through from said one surface to the opposite surface and an internal space continuous with the through hole.

The capacitor, which includes a dielectric ceramic material having at least one through hole, is provided with electrodes at surfaces where the through hole of the dielectric ceramic material opens, with one of the electrodes secured onto said one surface of the grounding metal.

The through conductor passes through the capacitor and the grounding metal and connected to another of the electrodes so as to achieve electrical continuity. The insulating tube covers the through conductor.

The insulating case is provided at said one surface of the grounding metal, with one end of the insulating case fitted around an external circumference of the raised portion. The insulating resin fills a space inside the insulating case, the internal space of the grounding metal and a space around the capacitor.

The insulating resin portion filling the space inside the insulating case comprises an epoxy resin containing a brominated fire retardant, and the brominated fire retardant is a brominated aromatic glycidyl ether.

When the high-voltage capacitor structured as described above is employed in the magnetron of a microwave oven, noise traveling through the through conductor can be absorbed through the filtering effect of the capacitor, which is achieved by using the through conductor as a power supply terminal and connecting the capacitor between the through conductor and the grounding metal achieving a ground potential.

In addition, since the grounding metal is provided with a through hole and the capacitor is also provided with a through hole passing through the dielectric ceramic material, the through conductor achieving a higher potential relative to the ground potential can be installed while the through holes ensure a sufficient degree of electrical insulation from the grounding metal and one of the electrodes of the capacitor achieving the ground potential.

Furthermore, since the insulating resin fills the space inside the insulating case, the internal space of the grounding metal and the space around the capacitor, a higher degree of reliability is achieved in reliability tests such as high temperature load tests and moisture resistance load tests or when the high-voltage capacitor is used in a hot and highly humid environment.

The present invention is characterized in that the insulating resin portion filling the space inside the insulating case comprises an epoxy resin containing a brominated fire retardant and the brominated fire retardant is a brominated aromatic glycidyl ether, in the generally adopted structure explained earlier.

The brominated aromatic glycidyl ether, which is in the form of liquid, comprises small-size particles. Consequently, prevention of particle settling is achieved, which ensures complete contact at the interface of the insulating resin. This increases the bonding forces at the interfaces between the insulating case and the insulating resin portion filling the inside of the case and between the grounding metal and the insulating resin portion filling the inside of the case, and the bonding force at the interface between the capacitor and the insulating resin portion filling the space around the capacitor. Consequently, it is fully possible to withstand the mechanical stress attributable to the hardening/contraction of the insulating resin or the electrostrictive phenomenon occurring at the dielectric ceramic material during use. This provides a high-voltage capacitor achieving a high degree of reliability in which deterioration of the characteristics and electrical short circulation are avoided by increasing the bonding forces at the interfaces between the insulating case and the insulating resin portion filling the inside of the case and between the grounding metal and the insulating resin portion filling the inside of the case and the bonding force at the interface between the capacitor and the insulating resin portion filling the space around the capacitor, and thus preventing separation at the interfaces.

The present invention also discloses a magnetron utilizing the high-voltage capacitor of the present invention as a filter.

BRIEF DESCRIPTION OF DRAWINGS

Other objects, structural features and advantages of the present invention are explained in further detail by referring to the attached drawings. The attached drawings simply present illustrations of embodiments.

DETAILED DESCRIPTION OF THE PREFERRED EMBODIMENTS

Figure 1:
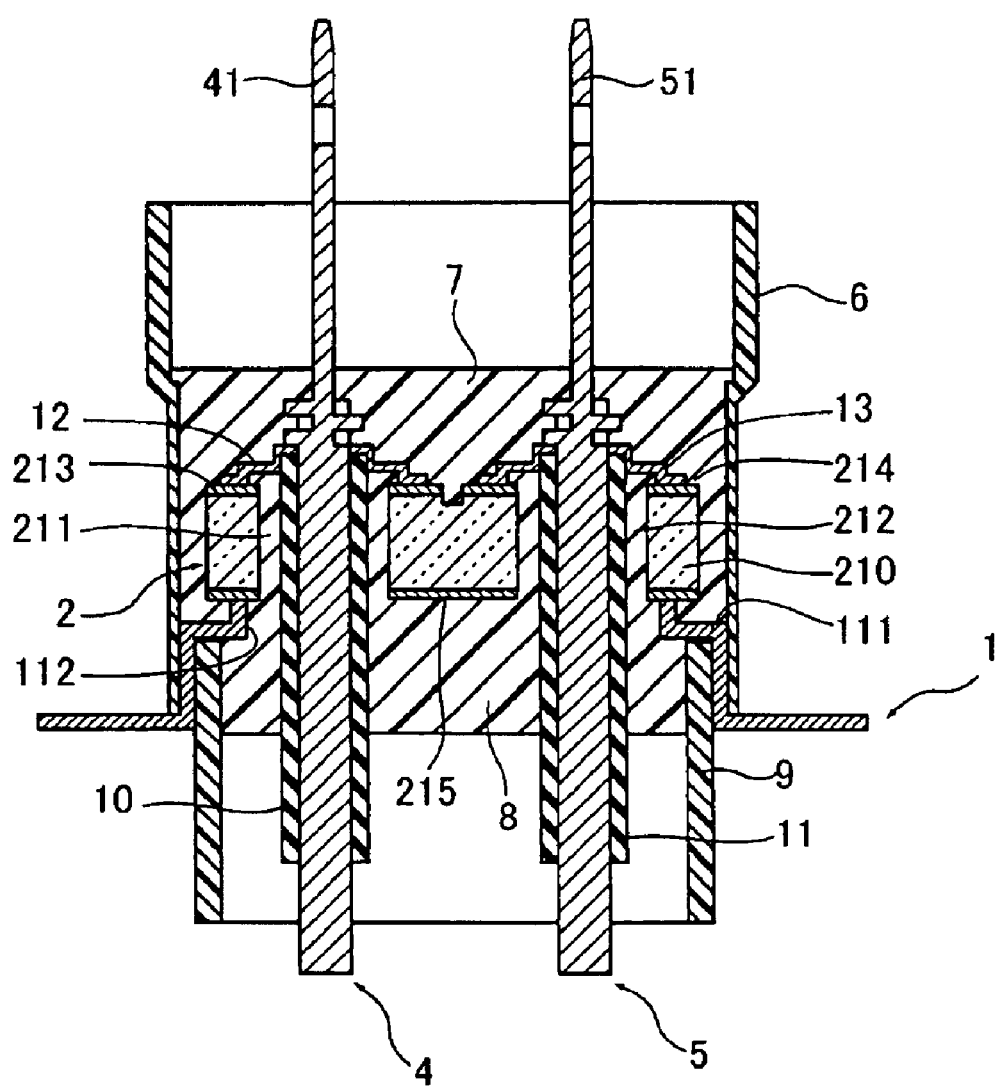
FIG. 1 is a sectional front view of an example of the high-voltage capacitor according to the present invention.
Figure 2:
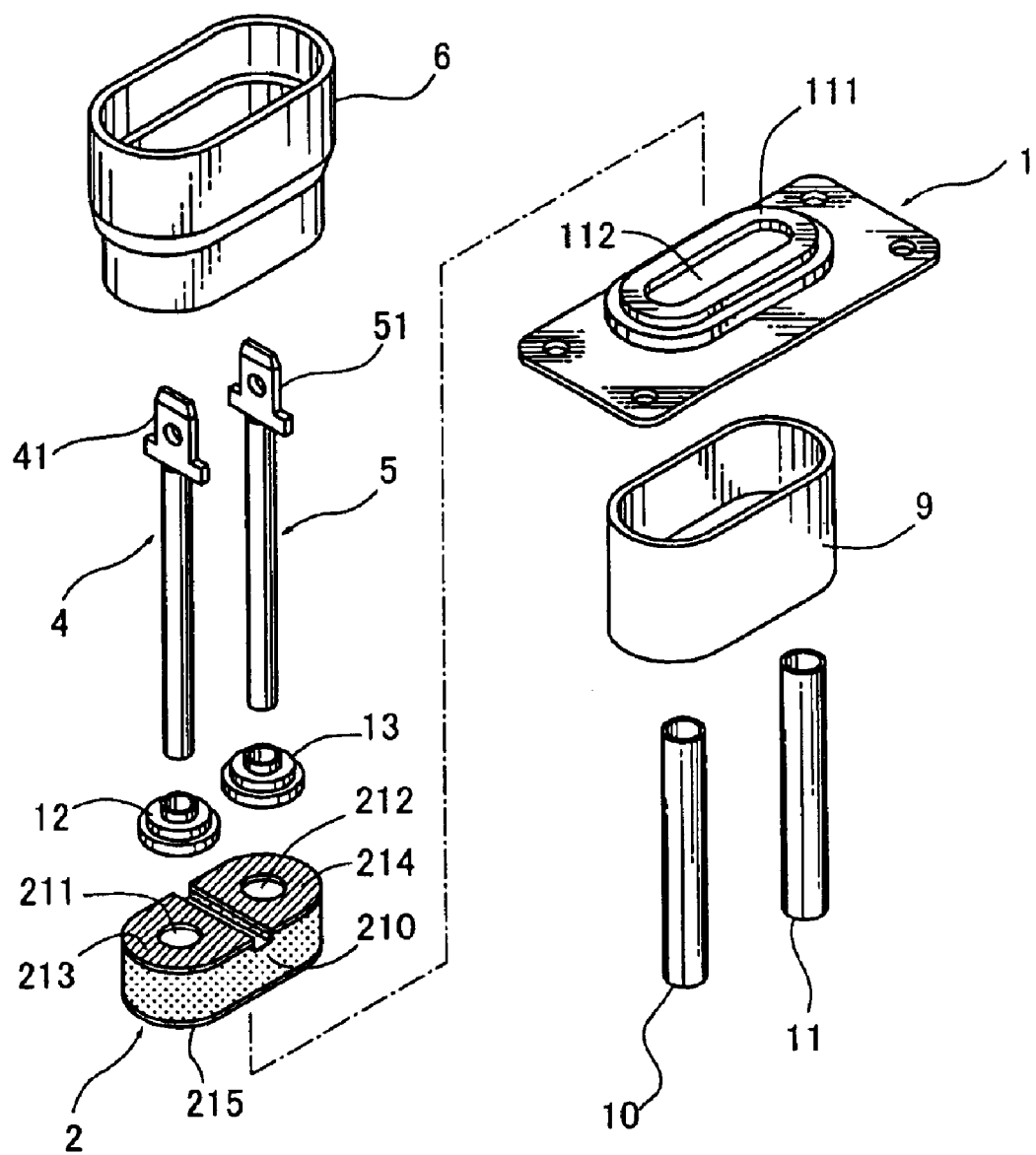
FIG. 2 is an exploded perspective view of the high-voltage capacitor shown in FIG. 1.

Referring to FIGS. 1 and 2, the high-voltage capacitor includes a grounding metal 1, a capacitor 2, through conductors 4 and 5, an insulating case 6, an outer insulating resin 7, an inner insulating resin 8, an insulating cover 9 and insulating tubes 10 and 11 constituted of silicon or the like.

The grounding metal 1 has a raised portion 111 at one surface thereof, with the raised portion 111 having a through hole 112. The capacitor 2 is provided on the raised portion 111 and an electrode 215 of the capacitor is secured to the raised portion 111 by a means such as soldering. The through conductors 4 and 5 pass through the through holes 211 and 212 of the capacitor 2 respectively and also through the through hole 112 of the grounding metal 1 and are connected to electrodes 213 and 214 respectively via electrode conductors 12 and 13 achieving electrical continuity.

The outer insulating resin 7 fills the space around the capacitor 2 at one surface of the grounding metal 1 and is in close contact with the surface of the dielectric ceramic material 210. The inner insulating resin 8 fills the through holes 211 and 212 of the capacitor 2 at the other surface of the grounding metal 1 and is in close contact with the surface of the dielectric ceramic material 210. The outer insulating resin 7 is constituted of a thermosetting epoxy resin containing a brominated fire retardant, and the brominated fire retardant is a brominated aromatic glycidyl ether.

The insulating tubes 10 and 11 cover the portions of the through conductors 4 and 5 that are located inside the through holes 211 and 212 respectively.

The insulating case 6 and the insulating cover 9 may be constituted of polybutylene terephthalate, polyethylene terephthalate or modified melamine. The insulating case 6 is fitted around the external circumference of the raised portion 111 of the grounding metal 1. The insulating cover 9 is fitted at the internal circumference of the raised portion 111 of the grounding metal 1. The outer insulating resin 7 fills the space inside the insulating case 6, whereas the inner insulating resin 8 fills the inside of the insulating cover 9, the inner space of the raised portion 111 of the grounding metal 1 and the through holes 211 and 212 of the capacitor 2.

The composition of the dielectric ceramic material 210 constituting the capacitor 2 is of the known art. A specific example is a composition having $BaTiO_3$—$BaZrO_3$—$CaTiO_3$—$MgTiO_3$ as its main constituent and one or a plurality of types of additives.

The capacitor 2 is provided on the grounding metal 1 with its electrode 215 fixed on one surface of the grounding metal 1. The through conductors 4 and 5 pass through the capacitor 2 and the grounding metal 1 and are connected to the electrodes 213 and 214 achieving electrical continuity. Thus, in an application in a magnetron in a microwave oven, a high-voltage capacitor that absorbs noise traveling through the through conductors 4 and 5 is achieved. The filtering function of the capacitor 2 is achieved by using the conductors 4 and 5 as power supply terminals 41 and 51 and connecting the capacitor 2 between the conductors 4, 5 and the grounding metal 1.

The grounding metal 1 is provided with at least one through hole 112 and the capacitor 2 is provided with at least one through hole 211 or 212 passing through the dielectric ceramic material 210. Thus, the through conductors 4 and 5 achieving higher potentials relative to the ground potential can be installed with a sufficient degree of electrical insulation from the grounding metal 1 and the electrode 215 of the capacitor 2 achieving the ground potential, which is assured by the presence of the through holes 211 and 212.

Since the insulating resins 7 and 8 fill the spaces around the capacitor 2, a higher degree of reliability is achieved in reliability tests such as high temperature load tests and moisture resistance load tests or when the high-voltage capacitor is used in a hot and highly humid environment.

The present invention is characterized in that the insulating resin portion filling the space inside the insulating case 6 comprises an epoxy resin containing a brominated fire retardant and the brominated fire retardant is a brominated aromatic glycidyl ether, in the generally adopted structure explained earlier. The brominated aromatic glycidyl ether, which is in the form of liquid, comprises small-size particles. Consequently, prevention of particle settling is achieved, which ensures complete contact at the interface of the insulating resin.

This increases the bonding forces at the interfaces between the insulating case 6 and the insulating resin portion filling the inside of the case and between the grounding metal 1 and the insulating resin portion filling the inside of the case, and the bonding force at the interface between the capacitor 2 and the insulating resin portion filling the space around the capacitor. Consequently, it is fully possible to withstand the mechanical stress attributable to the hardening/contraction of the insulating resin or the electrostrictive phenomenon occurring at the dielectric ceramic material 210 during use.

This provides a high-voltage capacitor achieving a high degree of reliability in which deterioration of the characteristics and electrical short circulation are avoided by increasing the bonding forces at the interfaces between the insulating case and the insulating resin portion filling the inside of the case and between the grounding metal and the insulating resin portion filling the inside of the case and the bonding force at the interface between the capacitor and the insulating resin portion filling the space around the capacitor, and thus preventing separation at the interfaces.

Now, explanation is given with reference to the experimental data described below.

High-voltage capacitors of the present embodiment were fabricated with an epoxy resin containing a brominated aromatic glycidyl ether as a brominated fire retardant. In the preparation of the epoxy resin, the bromine content was set within a range of 40 wt % to 60 wt % relative to the quantity of the brominated aromatic glycidyl ether and was set within a range of 2 wt % to 6 wt % relative to the entire quantity of the epoxy resin including filler. The brominated aromatic glycidyl ether has a molecular weight of 200 to 400.

High-voltage capacitors of the comparison example were fabricated with an epoxy resin containing hexabromobenzene that is an additional fire retardant.

1. High-Temperature Load Test

In the high-voltage capacitor shown in FIGS. 1 and 2, ten samples were made from each respective insulating resin mentioned above and were examined in a high-temperature load test. In the high-temperature load test, the sample to be examined was placed in a constant-temperature bath, the temperature was maintained at 120° C., a DC voltage of 15 kV was continuously applied to the sample and the time length to make a breakdown was measured. Table I presents the result of the high-temperature load test.

TABLE I

| | test condition 120° C. – DC 15 kV (n = 10 (each insulating resin)) unit: hour sample No. | | | | | | | | | |
|---|---|---|---|---|---|---|---|---|---|---|
| | 1 | 2 | 3 | 4 | 5 | 6 | 7 | 8 | 9 | 10 |
| comparison example | 37 | 50 | 56 | 68 | 98 | 156 | 244 | 278 | 334 | 454 |
| embodiment | 1165 | 1190 | 1190 | 1190 | 1190 | 1192 | 1192 | 1282 | 1282 | 1501 |

Referring to table I, the time lengths to make a breakdown in the high-voltage capacitors of the embodiment are 2.6 to 40 times greater than those in the high-voltage capacitors of the comparison example. This indicates improvement in reliability.

2. AC Breakdown Voltage Test

Figure 3:
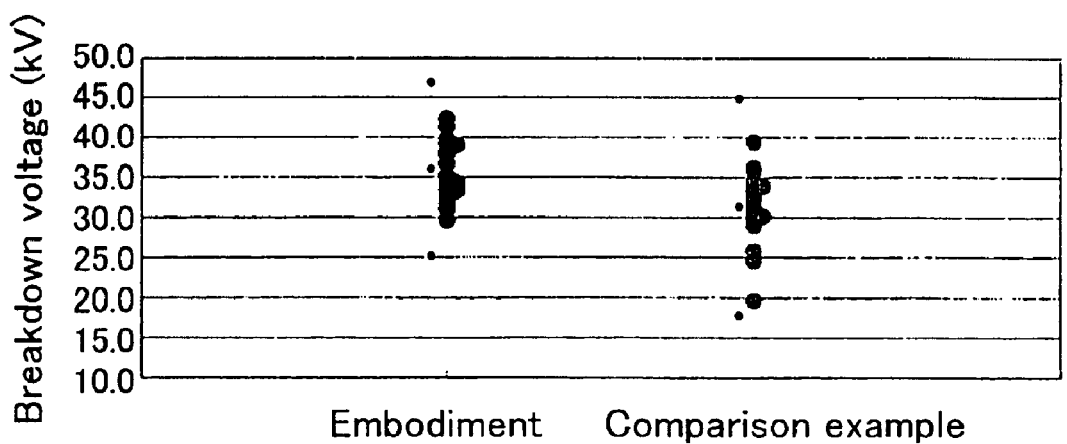
FIG. 3 is a distribution chart of the result of the AC breakdown voltage test shown in table II.

In the high-voltage capacitor shown in FIGS. 1 and 2, twenty samples were made from each respective insulating resin mentioned above and were examined in an AC breakdown voltage test. In the AC breakdown voltage test, a sine-wave AC voltage of 50 Hz in frequency was applied to the sample at room temperature, and the AC voltage was gradually increased from 0V until breakdown occurred, then the breakdown voltage was measured. Table II presents the result of the AC breakdown voltage test. FIG. 3 is a distribution chart of the result of the AC breakdown voltage test shown in table II.

TABLE II

| sample No. | test item unit: kV | |
| --- | --- | --- |
| | embodiment AC breakdown voltage | comparison example AC breakdown voltage |
| 1 | 29.6 | 19.6 |
| 2 | 31.0 | 24.5 |
| 3 | 31.8 | 25.7 |
| 4 | 32.2 | 28.9 |
| 5 | 33.1 | 29.0 |
| 6 | 33.3 | 29.2 |
| 7 | 33.3 | 30.1 |
| 8 | 34.3 | 30.1 |
| 9 | 34.3 | 30.4 |
| 10 | 35.1 | 31.5 |
| 11 | 36.6 | 32.3 |
| 12 | 37.8 | 33.4 |
| 13 | 38.1 | 33.8 |
| 14 | 38.2 | 33.9 |
| 15 | 38.9 | 33.9 |
| 16 | 38.9 | 34.0 |
| 17 | 39.4 | 34.4 |
| 18 | 39.7 | 35.8 |
| 19 | 41.3 | 36.1 |
| 20 | 42.3 | 39.3 |
| min | 29.6 | 19.6 |
| max | 42.3 | 39.3 |
| ave | 36.0 | 31.3 |
| σ | 3.6 | 4.5 |
| ave + 3 σ | 46.8 | 44.8 |
| ave − 3 σ | 25.1 | 17.8 |

Referring to table II, the average breakdown voltage in the high-voltage capacitors of the embodiment is 36.0 kV, which is about 5 kV greater than the average breakdown voltage of 31.3 kV in the high-voltage capacitors of the comparison example. The standard deviation σ of breakdown voltage in the embodiment is 3.6 kV, which is smaller than 4.5 kV in the comparison example, and the variability in the embodiment is smaller than in the comparison example. Consequently, the present invention provides a high-voltage capacitor achieving a high degree of reliability.

With regard to the breakdown mode, the resulting number of breakdowns at the groove formed in the dielectric ceramic material is decreased in the high-voltage capacitors of the embodiment. This indicates improvement in the contact between the dielectric ceramic material and the insulating resin.

Macro-photographs of the cross-sections and resin cross-sections in the high-voltage capacitor shown in FIGS. 1 and 2 and in the test pieces made from the above-mentioned insulating resins were examined to show that grains or aggregate grains of fire retardant in the embodiment were of smaller sizes than in the comparison example, and the contact between the dielectric ceramic material and the insulating resin in the embodiment was good.

Consequently, deterioration of the characteristics and electrical short circulation are avoided by increasing the bonding forces at the interfaces between the insulating case and the insulating resin portion filling the inside of the case and between the grounding metal and the insulating resin portion filling the inside of the grounding metal and the bonding force at the interface between the capacitor and the insulating resin portion filling the space around the capacitor, and thus preventing separation at the interfaces.

In the insulating resin used -in the embodiment, the brominated aromatic glycidyl ether has a molecular weight of 200 to 400.

Figure 4:
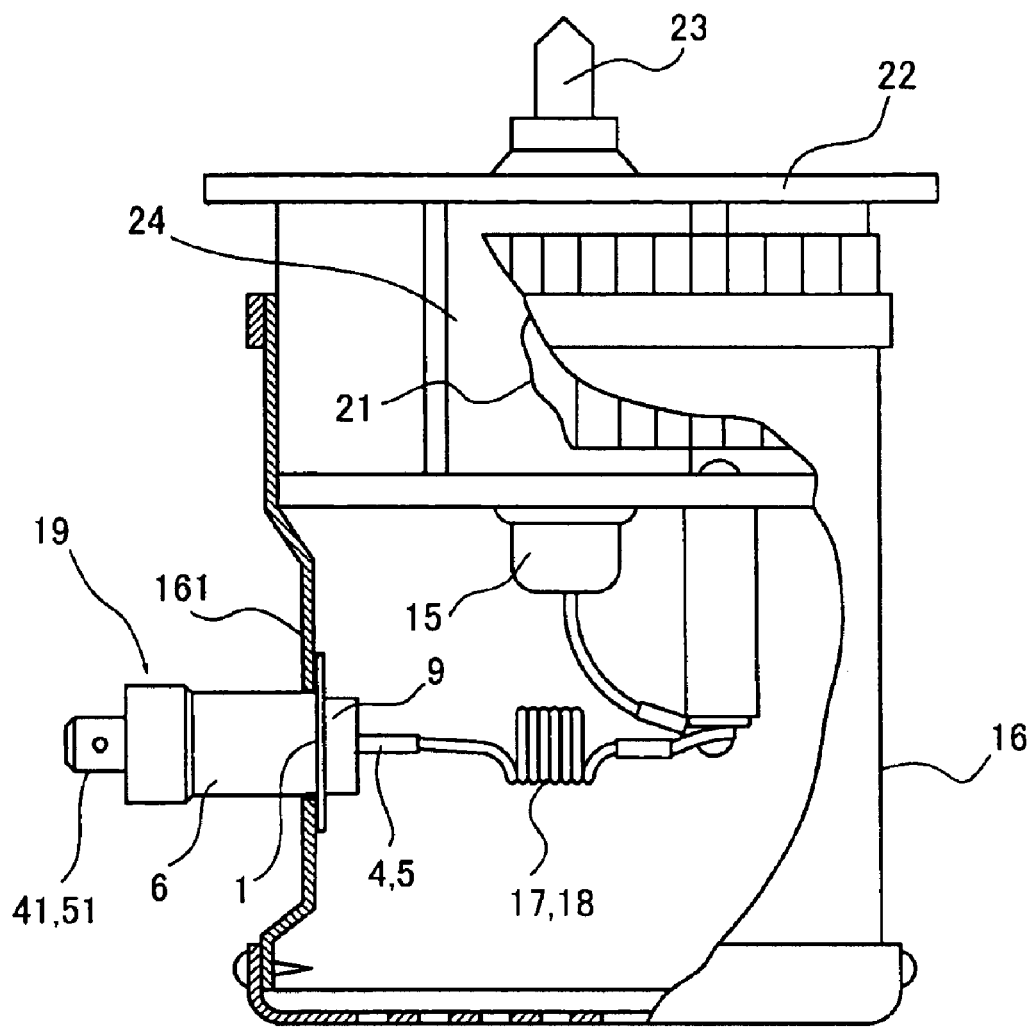
FIG. 4 is a cross-sectional view of a portion of a magnetron employing the high-voltage capacitor according to the present invention.

FIG. 4 is a cross-sectional view of a portion of a magnetron utilizing the high-voltage capacitor according to the present invention as a filter, with reference number 15 indicating a cathode stem, reference number 16 indicating a filter box, reference numbers 17 and 18 each indicating an inductor and reference number 19 indicating a high-voltage capacitor according to the present invention utilized in combination with the inductors 17 and 18 to constitute a filter. The filter box 16 encloses the cathode stem 15. The high-voltage capacitor 19 is provided so as to pass through a through hole formed at a side plate 161 of the filter box 16 and expose its outer insulating resin 7 to the outside, with its grounding member 1 securely attached to the side plate 161 of the filter box 16. The inductors 17 and 18 are connected in series between the cathode terminal of the cathode stem 15 and the through conductors 4 and 5 of the high-voltage capacitor 19 inside the filter box 16. Reference number 21 indicates cooling fins, reference number 22 indicates a gasket, reference number 23 indicates an RF output end and reference number 24 indicates a magnet.

A voltage of approximately 4 $kV_{O-P}$ having commercial frequency or a frequency within the range of 20 kHz to 40 kHz is supplied to the conductors 4 and 5 of the high-voltage capacitor 19 to oscillate the magnetron in the microwave oven. The high voltage thus supplied is then supplied to the magnetron from the conductors 4 and 5 via the inductors 17 and 18. Any noise coming through the conductors 4 and 5 is absorbed through the filtering function achieved by the capacitor 2 and the inductors 17 and 18.

In addition, since the spaces around the capacitor 2 are filled by the insulating resins 7 and 8, a sufficient degree of reliability is assured even when the high-voltage capacitor is employed in a microwave oven, which is a hot, highly humid environment.

Furthermore, as described with reference to FIGS. 1 and 2, the insulating resin of the high-voltage capacitor 19 comprises an epoxy resin containing a brominated fire retardant and the brominated fire retardant is a brominated aromatic glycidyl ether. Thus, a higher degree of moisture resistance is achieved by increasing the bonding forces at the interfaces of the insulating resin, and preventing separation at the interfaces, and thus avoiding deterioration of the characteristics and electrical short circulation. Consequently, a higher degree of reliability is assured when the high-voltage capacitor is employed in a microwave oven, which is a hot, highly humid environment.

While the present invention have been described in detail with reference to the preferred embodiment thereof, the present invention is not limited to this embodiment and it is obvious that those skilled in the art can make various variations based on the basic technical idea and teachings of the invention.

What is claimed is:

1. A high-voltage capacitor comprising:
at least one grounding metal having a raised portion at one surface thereof, with said raised portion having a through hole passing through from said one surface to the opposite surface and an internal space continuous with said through hole;
at least one capacitor including a dielectric ceramic material having at least one through hole and is provided with electrodes at surfaces where said through hole of said dielectric ceramic material opens, with one of said electrodes secured onto said one surface of said grounding metal;

at least one through conductor passing through said capacitor and said grounding metal and connected to another of said electrodes so as to achieve electrical continuity;

at least one insulating tube covering said through conductor;

at least one insulating case provided at said one surface of said grounding metal, with one end of said insulating case fitted around an external circumference of said raised portion; and insulating resin filling a space inside said insulating case, said internal space of said grounding metal and a space around said capacitor, wherein:

an insulating resin portion filling the space inside said insulating case comprises an epoxy resin containing a brominated fire retardant, and the brominated fire retardant is a brominated aromatic glycidyl ether.

2. The high-voltage capacitor of claim 1, wherein:

the bromine content in the insulating resin portion is set within a range of 2 wt % to 6 wt % relative to the entire quantity of the epoxy resin including filler and is set within a range of 40 wt % to 60 wt % relative to the quantity of the brominated aromatic glycidyl ether; and the brominated aromatic glycidyl ether has a molecular weight of 200 to 400.

3. A magnetron utilizing a high-voltage capacitor as a filter, wherein said high-voltage capacitor is constituted of the high-voltage capacitor of claim 1.

4. A magnetron utilizing a high-voltage capacitor as a filter, wherein said high-voltage capacitor is constituted of the high-voltage capacitor of claim 2.

* * * * *